US012600184B1

(12) United States Patent
Sparks

(10) Patent No.: US 12,600,184 B1
(45) Date of Patent: Apr. 14, 2026

(54) MODULAR MULTI-HEIGHT HITCH ATTACHMENT SYSTEM FOR SKID STEER EQUIPMENT

(71) Applicant: Knox A. Sparks, Sandpoint, ID (US)

(72) Inventor: Knox A. Sparks, Sandpoint, ID (US)

( * ) Notice: Subject to any disclaimer, the term of this patent is extended or adjusted under 35 U.S.C. 154(b) by 0 days.

(21) Appl. No.: 19/281,488

(22) Filed: Jul. 25, 2025

(51) Int. Cl.
*B60D 1/46* (2006.01)
*B60D 1/52* (2006.01)
*B60D 1/00* (2006.01)

(52) U.S. Cl.
CPC ................. *B60D 1/46* (2013.01); *B60D 1/52* (2013.01); *B60D 2001/001* (2013.01)

(58) Field of Classification Search
CPC . B60D 1/06; B60D 1/065; B60D 1/07; B60D 1/075; B60D 1/42; B60D 1/46; B60D 1/52; B60D 2001/001; B66F 9/06
USPC .......................................... 224/400
See application file for complete search history.

(56) References Cited

U.S. PATENT DOCUMENTS

| | | | | |
|---|---|---|---|---|
| 7,108,475 | B1 * | 9/2006 | Gustafson | ............ A01D 87/122 |
| | | | | 280/416.2 |
| 11,400,850 | B1 * | 8/2022 | Curtis, III | ................. B66F 9/18 |
| 2009/0084471 | A1 * | 4/2009 | Brent | .................... C23C 22/361 |
| | | | | 148/253 |
| 2020/0156424 | A1 * | 5/2020 | Anderson | ................ B60D 1/46 |
| 2022/0402318 | A1 * | 12/2022 | Borkholder | ............ B60D 1/065 |

FOREIGN PATENT DOCUMENTS

| | | | | | |
|---|---|---|---|---|---|
| CA | 3093949 | C | * | 5/2023 | |
| CN | 120207028 | A | * | 6/2025 | ............... B60D 1/06 |

OTHER PUBLICATIONS

CN-120207028-A Translation, LV, Jian-wen, Jun. 27, 2025 (Year: 2025).*

* cited by examiner

*Primary Examiner* — Nathan J Newhouse
*Assistant Examiner* — Matthew T Theis
(74) *Attorney, Agent, or Firm* — Sam Pierce

(57) ABSTRACT

A modular, multi-height hitch attachment system for skid steer loaders is disclosed. The system includes a lightweight, high-strength frame configured to engage the quick-attach mounting plate of a skid steer without tools, utilizing the machine's integrated locking pin mechanism. The frame comprises a vertically oriented aperture array that permits selective height adjustment of trailer hitches or modular worksite tools. In single-unit use, the system supports accessories such as vises, workbenches, and welding platforms. In dual-unit configuration, two systems operate in tandem to support wide-span or load-bearing implements such as forks or hay spears. The device reduces attachment weight by over 70%, fits within a standard truck toolbox, and offers enhanced visibility and operational versatility. Modular accessories are quickly interchangeable in the field, enabling rapid task transitions and expanding the functional capability of skid steer equipment across construction, agricultural, and industrial applications.

10 Claims, 2 Drawing Sheets

MODULAR MULTI-HEIGHT HITCH ATTACHMENT SYSTEM FOR SKID STEER EQUIPMENT

BACKGROUND OF THE INVENTION

Field of Invention

The present invention relates generally to skid steer loader attachments and, more particularly, to a modular, multi-height hitch system for skid steer equipment that facilitates towing, lifting, and tool integration. The invention specifically addresses the need for lightweight, compact, and versatile hitch solutions that enable both single-unit and dual-unit modularity for enhanced operational flexibility in construction, agricultural, and industrial environments.

BRIEF SUMMARY OF THE INVENTION

The present invention provides a modular, multi-height hitch attachment system for skid steer machinery, herein referred to as the HitchLok. Designed to replace conventional single-purpose, heavyweight attachments, the Hitch-Lok comprises a lightweight structure with a high load-bearing capacity, operable on one or both sides of a skid steer quick-attach plate. It includes an adjustable vertical configuration to accommodate varying trailer heights and support diverse worksite tasks.

The invention supports both single-unit and dual-unit modular configurations, enabling the attachment of auxiliary tools such as workbenches, vises, hay spears, forks, and welding tables. The device utilizes the skid steer's integrated locking pin system for secure engagement and does not require additional tools for installation or removal. The system's compact form factor allows it to be transported in a standard truck toolbox and delivers significant weight and cost reductions compared to traditional solutions.

In a preferred embodiment, tractors that have a universal attachment plate, which constitute a substantial portion of tractors, work with the HitchLok.

DETAILED DESCRIPTION

Figure 1:
FIG. 1 is a front perspective view illustrating the Hitch-Lok installed on a skid steer, showing secure engagement with one side of the skid steer's quick-attach mounting plate via the integrated locking pin system.

The present invention, herein referred to as the HitchLok, comprises a unitary or integrally fabricated hitch assembly configured for interfacing with standardized quick-attach mounting plates of skid steer loaders and analogous compact utility vehicles. The primary structure of the HitchLok is defined by a robust frame fabricated from high-strength, low-alloy steel, preferably ASTM A572 Grade 50 or equivalent, although alternative embodiments may employ advanced aluminum alloys such as 6061-T6 to facilitate further weight reductions without compromising load integrity. The overall mass of a single HitchLok unit, as presently embodied, is approximately 16 pounds, withstanding load capacities of up to 5,000 pounds under static and dynamic loading conditions.

The frame architecture comprises a vertically elongated support plate, reinforced by a pair of lateral gusseted brackets oriented orthogonally to the central spine. Said brackets function to stabilize torsional stresses and distribute axial forces along the mounting plane. Apertures configured for height adjustment are precision-machined into the central column at predetermined intervals, spaced to allow modular positioning of accessory hitches or tool interfaces. The dimensional tolerances of said apertures are governed by ANSI B92.1 standards to ensure secure fitment and repeatable alignment of inserted components.

In the preferred embodiment, all load-bearing junctions of the HitchLok are treated with full-penetration welds certified to AWS D1.1 structural welding codes, ensuring superior tensile and shear performance. Edges and contact faces are beveled or chamfered to reduce stress concentrations, and high-wear surfaces may be optionally treated with a wear-resistant polymeric or ceramic coating to mitigate corrosion and extend operational longevity in abrasive or chemically aggressive environments.

The exterior surface of the HitchLok is optionally finished with an industrial-grade powder coating or zinc-rich epoxy primer, conforming to ASTM B117 salt spray standards, to provide resistance to oxidation and mechanical degradation under field conditions. In addition, stress-bearing components may be subjected to post-weld heat treatment or shot peening processes to enhance fatigue resistance and improve the endurance limit under repeated load cycles.

The HitchLok's design enables a compact footprint optimized for both storage and transport, including dimensions suitable for accommodation within a conventional truck-mounted toolbox. Despite its compact profile, the geometry of the structure is engineered to resist flexural deflection and maintain rigidity under asymmetric loading, as may occur when lifting off-center trailer hitches or uneven modular tool attachments.

The structural configuration also contemplates optional integration of data capture elements, such as RFID tags or QR-coded plates, to enable asset tracking or usage logging in commercial fleet environments. Such elements are affixed in recessed locations shielded from mechanical impact.

Thus, the structural design and material selection of the HitchLok confer a unique combination of high load capacity, modular compatibility, field robustness, and compact form factor, heretofore unavailable in existing skid steer hitch attachment solutions.

The HitchLok is specifically engineered to interface compatibly and securely with the industry-standard quick-attach mounting plates utilized across a wide spectrum of skid steer loaders, including but not limited to those manufactured in compliance with ISO 24410 and SAE J2513 specifications. The mounting mechanism of the present invention is designed to exploit the inherent locking features of these plates without necessitating structural modification, supplemental tooling, or auxiliary fasteners during installation or removal.

The proximal mounting face of the HitchLok comprises an upper diagonal flange 209 and lower diagonal flange 210 configured to align flush against the quick-attach adapter plate of the host machine. Integrated within this interface are guide channels 203 and recessed shoulders 204 that correspond dimensionally with the contour of the skid steer's receiver rail. These features permit self-centering insertion and mitigate lateral misalignment during docking procedures.

Critical to the securement process is the utilization of the skid steer's integrated pin-lock system. The HitchLok incorporates a transversely oriented cylindrical sleeve aligned to receive the locking pins of the host plate. The sleeve is precision bored to allow minimal clearance fit, ensuring rigid axial fixation once the locking pins are engaged. Said engagement mechanism eliminates the need for third-party couplers or adapter brackets, thereby reducing failure points and simplifying the attachment process.

The actuation of the mounting process may be executed manually or hydraulically, contingent upon the capabilities of the skid steer platform in use. In either instance, the invention allows for toolless rapid attachment, reducing operator downtime and improving operational fluidity across jobsite transitions. The operator aligns the HitchLok's base plate with the skid steer's quick-attach face, inserts the unit into position, and activates the locking pins to affix the device. Removal is achieved via the reverse sequence without necessitating physical strain or ancillary implements.

An optional retention mechanism may be embodied in the form of a secondary mechanical latch or spring-loaded pin, integrated adjacent to the primary pin sleeve. This supplementary feature serves as a redundant safeguard against vibrational loosening or accidental disengagement during dynamic operation. In high-vibration or off-road scenarios, such as towing on uneven terrain, this enhancement provides additional assurance of mechanical integrity.

Further, the mounting surface may be supplemented with elastomeric damping pads or metal-to-metal isolation bushings to absorb shock loads transmitted from the host vehicle, thereby preserving structural fidelity over time. These isolation interfaces may be bonded or mechanically fastened to the HitchLok's base and are replaceable as wear components.

In alternative embodiments, the interface region may include indexing features such as embossed alignment ridges, detent notches, or magnetically assisted docking guides, all designed to assist in blind or low-visibility installations frequently encountered in field environments.

Accordingly, the mounting mechanism of the present invention provides a robust, repeatable, and field-serviceable interface between the HitchLok and a variety of skid steer loader platforms, enabling reliable and efficient deployment across a range of industrial, agricultural, and construction tasks.

The HitchLok incorporates a vertically adjustable interface system engineered to provide a plurality of discrete hitch elevation positions, thereby accommodating a broad range of trailer configurations, ground clearance conditions, and operator visibility requirements. This multi-height adjustment capability is achieved through a vertically arrayed matrix of precision-machined mounting apertures, integrated into the primary vertical spine of the hitch structure. Said apertures are dimensioned to receive standardized receiver tubes or modular attachment interfaces, with tolerances conforming to ISO 10027 and ANSI B18.2 specifications to ensure structural integrity and secure mating engagement.

The vertical spine is configured as a rigid monolithic or welded tubular steel structure, oriented orthogonally to the skid steer's attachment plane. Apertures are spaced at regular intervals along the longitudinal axis, with dimensional pitch calibrated to balance fine-grained adjustability and structural load distribution. The spacing and load rating of each aperture level are calculated using finite element analysis (FEA) models to ensure that stress concentrations and moment loads introduced by offset hitches or tool attachments do not exceed the elastic limit of the parent material under dynamic loading scenarios.

The operator selects the desired vertical position by aligning the accessory hitch element or modular tool bracket with the target aperture, securing it with a locking pin, clevis fastener, or through-bolt assembly. The locking mechanism may include a positive detent system or spring-biased ball catch to prevent unintended disengagement during operation. In one embodiment, the retention pin is tethered via a steel cable to the hitch structure to mitigate loss in the field and enhance usability.

Each vertical mounting position is engineered to serve distinct functional purposes. The uppermost aperture positions enable elevated hitching, thereby improving the operator's visual field during reverse maneuvers and providing increased articulation angles for trailer towing on uneven or sloped terrain. Conversely, the lowermost apertures permit hitching to trailers or implements situated close to the ground or with compromised landing gear, a condition frequently encountered in salvage, agricultural, or emergency recovery contexts.

The height adjustment system is further designed to maintain center-of-gravity stability across all configurations. The frame's cross-sectional geometry and lateral gusseting counteract the rotational moment that may be introduced by elevating the load attachment point. To further augment stability, the spine's aperture array may be laterally reinforced with welded flange collars or internal steel sleeves, thereby minimizing wear and elongation over prolonged operational cycles.

In optional embodiments, the aperture array may include numerical or symbolic indicia embossed or laser-etched adjacent to each position, permitting repeatable and documented setting configurations-particularly useful for fleet operations or standardized task repetition across work crews. Additionally, an inclinometer or mechanical index gauge may be integrated to assist with level-setting during attachment.

The multi-height adjustment system enables the HitchLok to function across diverse operational envelopes, minimizing the need for multiple specialized attachments and significantly reducing equipment costs, field inventory, and changeover time. This vertically adaptive interface system constitutes a key aspect of the invention's novelty and utility, providing unprecedented versatility in a compact, lightweight hitch design.

A core innovation embodied in the HitchLok system lies in its dual-mode modularity architecture, which enables both single-unit and dual-unit configurations to support a wide spectrum of auxiliary tools, industrial implements, and mechanical interfaces. The invention is expressly engineered to function as a universal mounting base for a plurality of worksite accessories, thereby transforming the skid steer from a unidimensional lifting apparatus into a multifunctional mobile workstation. This modular approach significantly mitigates the limitations associated with traditional skid steer hitching systems, which are typically monolithic and task-specific.

Single-Unit Modularity

In the single-unit configuration, one HitchLok unit is mounted to one side of the skid steer's quick-attach plate.

The unit's vertically adjustable aperture array functions as the docking interface for modular tools and accessories, which may include, but are not limited to, ball hitches, workbenches, vises, tool trays, portable welding tables, and agricultural implements. Each accessory is equipped with a mating interface—typically a rectangular or cylindrical insert shaft—that aligns with one of the HitchLok's adjustment apertures and is retained by a high-strength clevis pin, bolt, or locking rod.

The modular attachments may be fabricated from carbon steel, aluminum, or composite materials, and may further include integrated utility features such as power tool mounts, clamp interfaces, or surface treatments optimized for corrosion resistance or high-temperature operations. In industrial applications, modular workbenches may serve as mobile repair stations, while vises or anvils mounted via the HitchLok enable in-field fabrication or part stabilization during mechanical procedures. In agricultural settings, hay spears or bale forks may be selectively affixed for seasonal or task-based deployment.

Dual-Unit Modularity

In the dual-unit configuration, two HitchLok units are symmetrically mounted to both lateral sides of the skid steer's quick-attach plate. This bilateral orientation creates a structurally stable mounting framework for wide-span or heavy-duty modular attachments that require dual-point fixation for effective operation. Examples include fork lift tines for pallet handling, wide-frame worktables, large welding platforms, or load-distributing hay bale spears. When deployed in tandem, the two HitchLok units effectively emulate or surpass the functionality of much heavier and more expensive monolithic attachments, offering significant weight savings and increased deployment flexibility.

Dual-unit synchronization is maintained via cross-member accessories that bridge the two HitchLoks. These bridging components may include adjustable-width mounting bars or pre-fabricated attachment plates equipped with standardized pin interfaces. The mechanical integrity of dual-unit configurations is maintained through matched height positioning across both units, with alignment guides or stop pins ensuring co-planar engagement and balanced load distribution across the skid steer's attachment plane.

Each modular accessory may be designed to conform to a standardized interface protocol, enabling rapid interchangeability between tools without requiring specialized couplings or custom fittings. In preferred embodiments, the modular interface complies with SAE J2513 or ISO 23206 standards for mechanical quick-connect attachments.

The modular tool and accessory integration capability of the HitchLok is especially advantageous in logistics-intensive or remote environments, where equipment volume, transport cost, and operational flexibility are critical. By enabling a single base platform (i.e., the skid steer) to serve multiple roles via modular transformation, the HitchLok system provides a scalable and economically efficient solution to the problem of tool and attachment proliferation.

The modular architecture of the present invention therefore constitutes a transformative advancement in the field of skid steer accessories, offering users an extensible system that is lightweight, field-adaptable, and operationally diversified, without compromising on structural performance or safety.

The operational deployment of the HitchLok system is characterized by a streamlined, tool-free procedure that maximizes efficiency, minimizes operator burden, and enables rapid adaptation to dynamic worksite demands. The method of use contemplates both individual and dual-unit configurations and is designed to accommodate various environmental, functional, and ergonomic conditions commonly encountered in construction, agricultural, industrial, and emergency service domains.

To initiate deployment, the operator aligns the HitchLok unit with the skid steer's quick-attach mounting plate, engaging the system's integrated guide features to ensure proper lateral positioning. Once aligned, the operator activates the machine's built-in locking pins, which pass through the HitchLok's precision-aligned receiver sleeve or aperture. This engagement secures the unit mechanically to the host vehicle without necessitating manual tightening or the use of ancillary hardware. The entire mounting sequence may be completed within 30 seconds by a single operator, either from within the cab (on hydraulically actuated systems) or manually (on conventional platforms).

Upon securement, the operator determines the appropriate vertical positioning of the hitch or tool attachment, based on the operational context. For towing applications, the user selects an elevation level that optimizes line-of-sight visibility and trailer angle, particularly relevant when backing into couplings or negotiating uneven terrain. For lifting operations involving disabled, low-profile, or broken trailers, the operator selects a lower height position to increase leverage and ensure successful engagement with minimal risk of under-clearance or jack contact failure.

Following elevation selection, the desired accessory—such as a ball hitch, workbench, or fork attachment—is inserted into the corresponding aperture on the HitchLok's vertical spine and retained via a clevis pin or equivalent locking mechanism. Where applicable, the accessory may incorporate mechanical indexing features, such as detents, torque shoulders, or cross-lock tabs, to ensure correct angular orientation and prevent rotational slippage under load. The modular nature of the attachments permits rapid swapping in the field, with changeover times typically under one minute, enhancing operational continuity.

In dual-unit scenarios, the operator repeats the process for a second HitchLok mounted on the opposite side of the plate. Both units must be set to identical height levels to ensure horizontal alignment and symmetric load distribution. The paired units may then support bifurcated implements such as pallet forks, hay spears, or wide-surface tool platforms. Bridging bars or accessory cross-members may be utilized to couple the two HitchLok units, forming a rigid trans-load assembly. In high-precision or heavy-load use cases, optional stabilizing pins or alignment guides ensure that the paired configuration remains structurally unified under stress.

The HitchLok is particularly well-suited for environments requiring task fluidity and tool redundancy minimization. For example, in construction settings, a skid steer outfitted with the HitchLok may transition from trailer towing in the morning to serving as a mobile workstation by midday, with modular tools enabling on-site welding, assembly, or cutting. In agricultural operations, the same unit may be used sequentially for feed transportation, field fencing, and mechanical equipment repair—all facilitated by rapid attachment interchange. Emergency services, such as utility companies and disaster response teams, benefit from the system's compact storage form, enabling deployment from a standard service vehicle without the logistical overhead of hauling multiple heavy attachments.

Ergonomically, the HitchLok reduces strain and hazard exposure by allowing the operator to complete nearly all attachment and adjustment tasks from a standing or upright position, eliminating the need for under-machine access or overhead lifting. Furthermore, the system's lightweight design ensures compliance with OSHA lift limit guidelines and minimizes the risk of musculoskeletal injury during manual handling.

Operational longevity is further enhanced by the system's ruggedized construction and corrosion-resistant finishes, which enable deployment in adverse environments including mud, snow, salt spray, and abrasive soils. Where maintenance is required, the system's modularity and use of standardized fasteners simplify disassembly and component replacement, making it serviceable even in field conditions with limited tooling.

The HitchLok's operational methodology emphasizes adaptability, ergonomic safety, and mechanical efficiency. Its deployment across a broad spectrum of real-world use cases exemplifies its transformative value as a next-generation hitch and modular attachment platform for skid steer machinery.

DETAILED DESCRIPTION OF FIGURES

FIG. 1 illustrates the HitchLok hitch attachment system operatively installed on a conventional skid steer loader. The image shows the frame of the HitchLok secured to one lateral side of the quick-attach mounting plate of the skid steer, with the engagement sleeve of the device aligned to receive the integrated locking pin of the skid steer system. The frame is positioned such that its vertical spine extends upward from the mounting interface, presenting a plurality of evenly spaced apertures for height adjustment. This view emphasizes the unilateral installation characteristic of the device, confirming that only a single unit is required for initial operation and providing ergonomic access to the modular interface. The figure further demonstrates the minimal footprint of the HitchLok and its compatibility with industry-standard skid steer configurations without the need for auxiliary mounting brackets or hardware.

Figure 2:
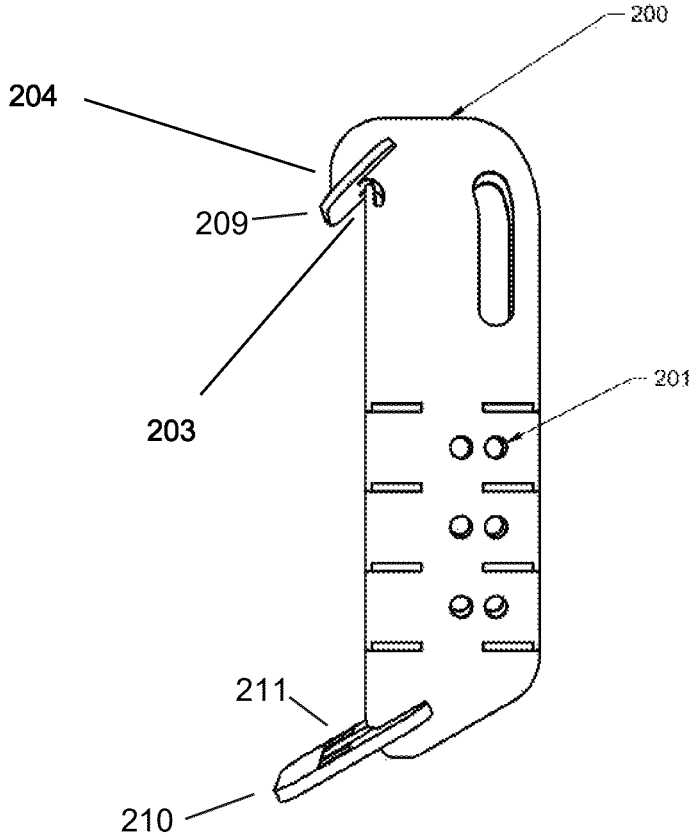
FIG. 2 is a standalone perspective view of the HitchLok unit 200, highlighting the structural frame and the locking bolt port 201 for quick attachment to a skid steer.
Figure 3:
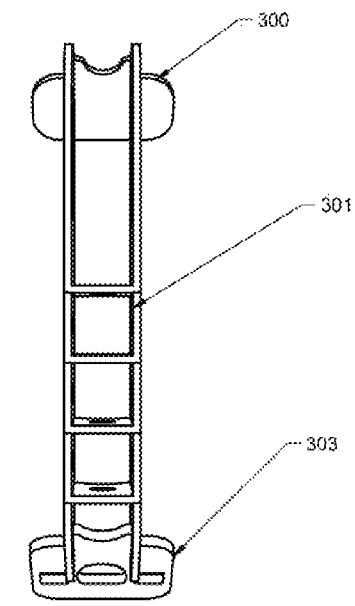
FIG. 3 is a side view of the HitchLok, illustrating the vertical support spine 300, lateral gusset bracket 301, and mounting interface flange 303.

FIG. 2 provides a perspective view of the HitchLok assembly in a standalone, unmounted configuration. The entire unit is designated as element 200, while the locking bolt port opening 211 is visible near the lower region of the mounting plate interface. This port enables direct engagement with the skid steer's locking mechanism and ensures secure attachment. The image also displays the vertical spine structure, incorporating a series of precision-machined apertures intended for modular accessory integration. These features are arrayed at regular intervals to provide adjustable height options for mounted implements. The overall compact footprint and structural reinforcement zones are visible, showcasing the unit's form factor and suitability for mobile deployment FIG. 3 presents a straight-on side elevation of the Hitch-Lok unit, highlighting three principal structural features. The main vertical support spine is designated as element 300, which houses the modular height adjustment apertures. Extending angularly between the spine 300 and the mounting interface is a lateral gusset bracket 301, which serves to enhance structural rigidity and distribute torsional loads. At the base of the assembly is the mounting interface flange 303, which provides the surface contact area with the skid steer plate and incorporates the locking bolt port (not visible in this view). This figure emphasizes the profile depth, load-bearing design, and compact structural composition of the unit.

Figure 4:
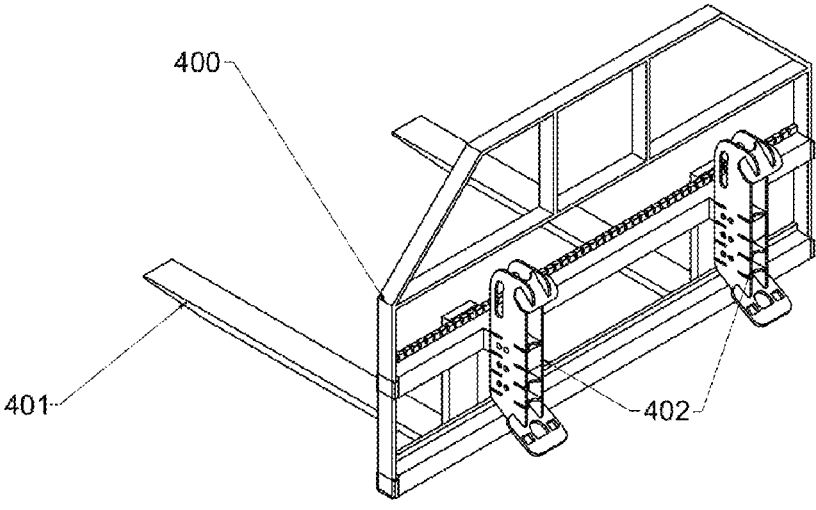
FIG. 4 shows a dual HitchLok configuration, with two units 200 supporting a modular fork carriage cross-member 400, projecting forward into fork tines 401 and aligned using parallel height index alignment 402.

FIG. 4 depicts a conceptual implementation of the Hitch-Lok system in a dual-unit configuration, with two identical units 200 mounted to opposing sides of a skid steer quick-attach plate. A cross-support attachment, referred to herein as fork carriage cross-member 400, spans between the two HitchLok units, coupling into aligned height adjustment apertures on each unit's spine. Projecting forward from the cross-member are fork tines 401, which serve as modular lifting implements for pallet or material transport. Also shown is the parallel height index alignment 4023, which ensures that both HitchLok units are mounted at identical vertical positions to maintain load balance. This configuration demonstrates the structural scalability and modular versatility of the invention when operating in a dual-point load distribution mode.

What is claimed is:

1. A hitch attachment system for a skid steer loader, comprising:
   a frame configured to be mounted to a quick-attach mounting plate of a skid steer loader, the frame having a front face and a rear face;
   at least one receiver aperture formed vertically along the frame, the receiver aperture configured to receive a modular accessory;
   an upper diagonal flange extending from the frame and forming a channel configured to sit atop the quick-attach mounting plate of the skid steer loader; and
   a lower diagonal flange extending from the frame and being configured to sit beneath the skid steer loader's lower receiver rail with an opening adapted to receive a locking pin from the quick-attach mounting plate, securing the frame to the skid steer loader, wherein:
   the frame is mounted to one side of the quick-attach mounting plate of the skid steer loader; and
   the frame extends side-to-side less than the full width of the skid steer attachment plate.

2. The hitch attachment system of claim 1, wherein the frame is fabricated from high-strength steel or aluminum alloy and weighs less than 30 pounds.

3. The hitch attachment system of claim 1, wherein the receiver aperture comprises a vertically spaced array of apertures, each configured to allow selective height adjustment of the modular accessory.

4. The hitch attachment system of claim 1, further comprising an accessory mount selected from the group consisting of: a trailer hitch, a workbench platform, a vise holder, a hay spear, a pallet fork, and a welding table.

5. The hitch attachment system of claim 1, wherein the frame is coated with a corrosion-resistant finish conforming to ASTM B117 standards.

6. The hitch attachment system of claim 1, wherein the modular accessory is secured using a locking pin, clevis, or bolt, and includes a detent or spring-loaded mechanism for retention.

7. The hitch attachment system of claim 1, wherein two such hitch attachment systems are configured to be mounted to opposite sides of a skid steer mounting plate, enabling dual-point modular accessory support.

8. The hitch attachment system of claim 7, wherein a bridging element spans between the two hitch attachment systems, thereby supporting wide-span implements.

9. The hitch attachment system of claim 1, further comprising indicia on the frame corresponding to each receiver aperture to facilitate repeatable height settings.

10. The hitch attachment system of claim 1, wherein the system is sized such that it can fit within a box mountable in or on a truck bed.

* * * * *